E. SCHNEIDER.
ADJUSTABLE DUPLEX VIEW FINDER.
APPLICATION FILED JULY 17, 1913.

1,189,494.

Patented July 4, 1916.
2 SHEETS—SHEET 1.

Witnesses:
John Jessich.
Hattie Stillman.

Inventor
Eberhard Schneider
By his Attorney
N. A. de Bonneville

E. SCHNEIDER.
ADJUSTABLE DUPLEX VIEW FINDER.
APPLICATION FILED JULY 17, 1913.
1,189,494.
Patented July 4, 1916.
2 SHEETS—SHEET 2.
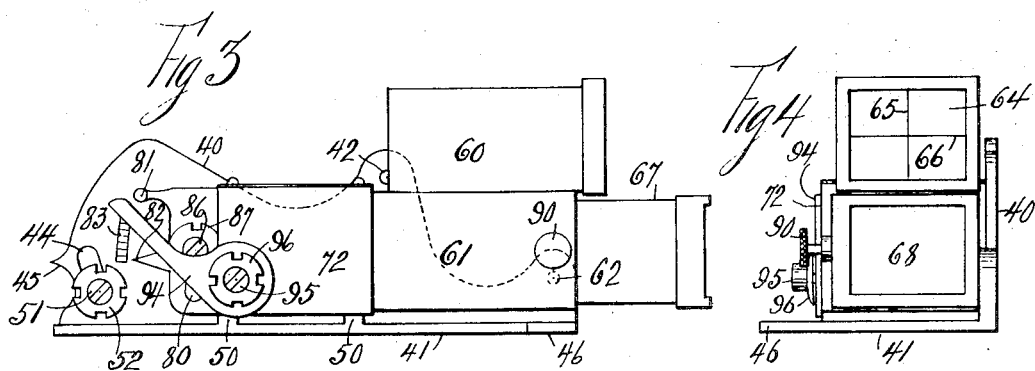
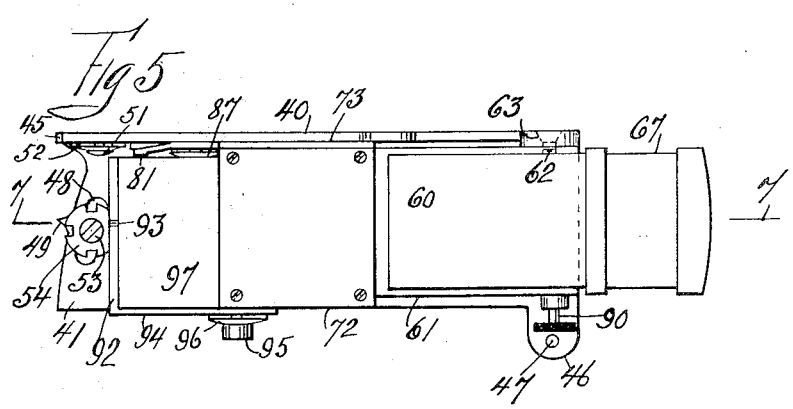
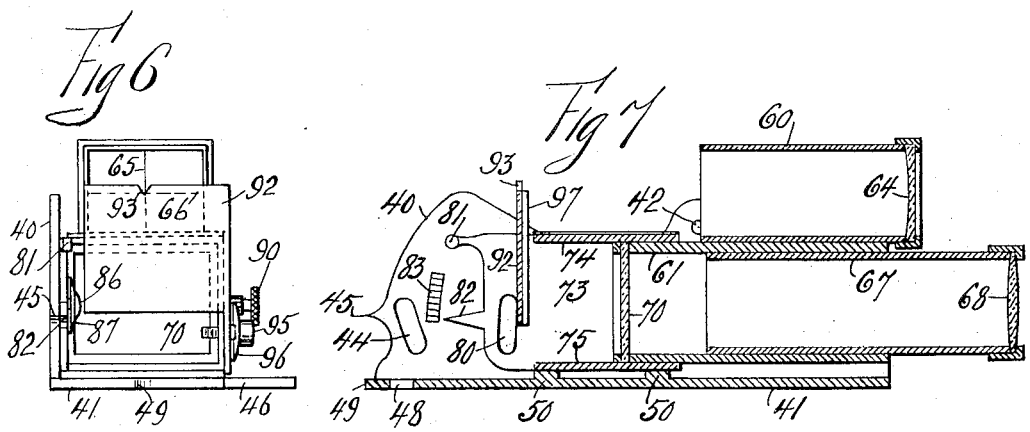
Witnesses:
John Jessich.
Hattie Stillman
Inventor
Eberhard Schneider
By his Attorney
A. A. de Bonneville

UNITED STATES PATENT OFFICE.

EBERHARD SCHNEIDER, OF NEW YORK, N. Y.

ADJUSTABLE DUPLEX VIEW-FINDER.

1,189,494.

Specification of Letters Patent.   Patented July 4, 1916.

Application filed July 17, 1913.   Serial No. 779,497.

*To all whom it may concern:*

Be it known that I, EBERHARD SCHNEIDER, a citizen of the United States, and a resident of the borough of Manhattan, in the county of New York and State of New York, have invented certain new and useful Improvements in Adjustable Duplex View-Finders, of which the following is a specification.

The object of this invention is the production of an adjustable duplex view finder for cameras, and is particularly adapted to moving picture cameras, although it may be used for many other styles of cameras.

With this finder the object to be photographed is viewed in the same position with respect to the longitudinal of the finder, as it would be viewed with respect to the longitudinal axis of the lens of a camera for which it is used.

The adjustments of the view finder comprise its principal points of novelty. The finder can be tipped or inclined either in a vertical or horizontal plane and thereby an object can be seen in full view in the finder, when the axial line of the lens of the camera passes through the center of the object to be photographed. The finder can be adjusted along its axial center so as to produce the object with sharp lines in the finder, and the latter adjustment indicates the adjustment to be made in the camera for the correct focus of the lens of the camera. The angular adjustments of the finder for a predetermined distance are always the same, and therefore when the objects to be photographed are at different distances, a scale indicates the proper angle to which the finder has to be inclined.

Motion picture cameras are generally either equipped with a two inch or a three inch lens, and the finders heretofore used not being adjustable are suitable for either one or the other of the lenses, but not for both.

The focal lengths of the lenses of my adjustable duplex finder is intermediate of the lenses generally used for motion picture cameras.

The finder has means for adjustably attaching it to either the top or side of the camera casing.

Figure 1:
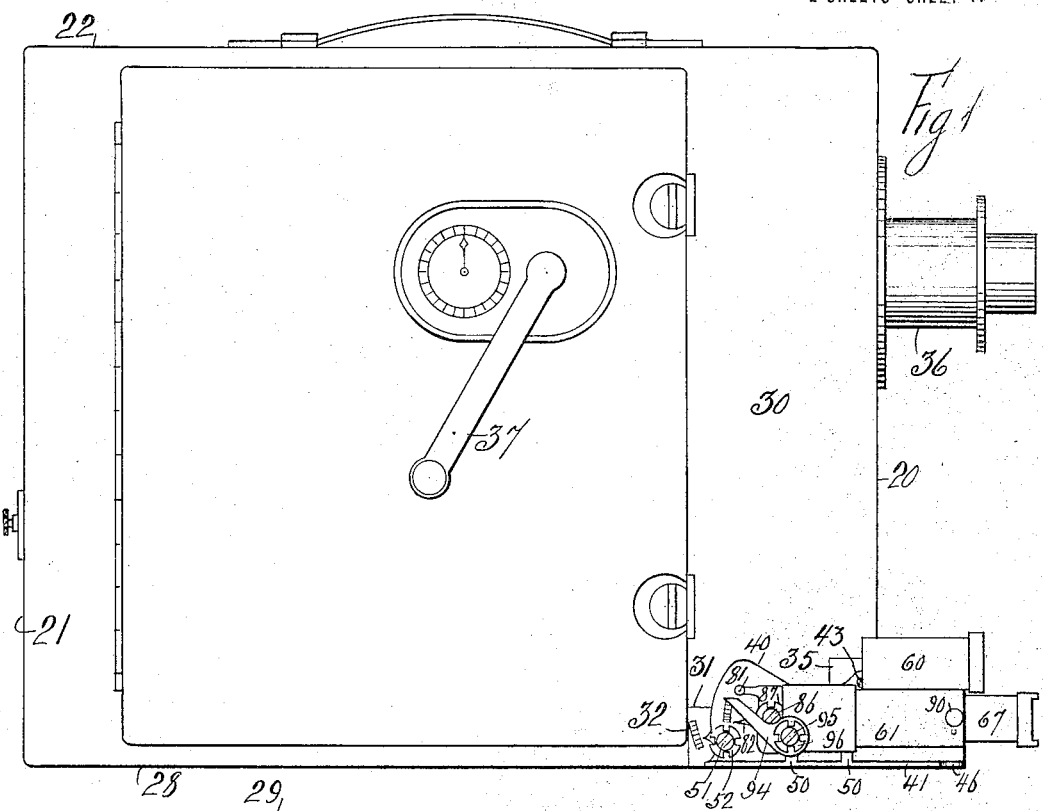
Figure 2:
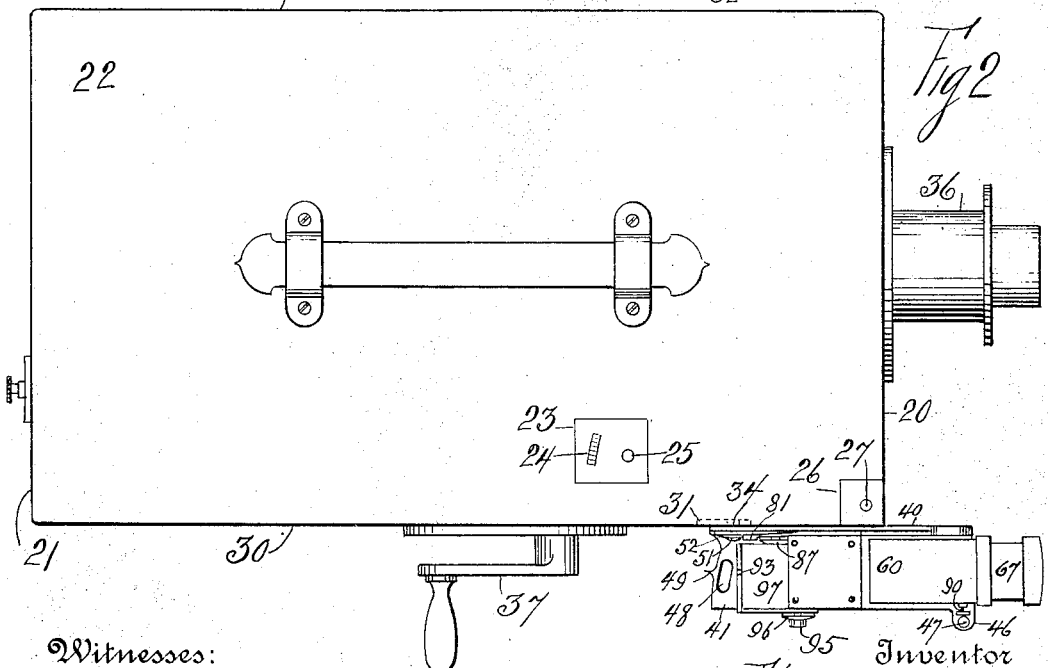

In the accompanying drawings, Figure 1 shows a side view of a motion picture camera with the finder attached thereto, Fig. 2 represents a top plan view of Fig. 1, Fig. 3 is an enlarged side view of the finder, Fig. 4 represents a right hand view of Fig. 3, Fig. 5 shows a top plan view of Fig. 3, Fig. 6 is a left hand view of Fig. 3 and Fig. 7 is a section of Fig. 5 on line 7, 7.

The camera casing is represented with the front wall 20, rear wall 21, roof 22, having set therein a plate 23 with the scale 24 and threaded opening 25, the plate 26 with a threaded opening 27, the bottom 28, and the side walls 29 and 30. A plate 31 with the scale 32 and threaded opening 34, and a plate 35 with a threaded opening are set in the side wall 30 of the camera casing.

The lens casing of the camera is represented at 36 and the operating handle at 37.

The view finder comprises the angle shaped frame having the vertical leg 40 and horizontal leg 41. The leg 40 has formed therein the opening 42 for a pivot screw 43, by means of which it is pivoted to the plate 35 of the side wall 30 of the camera casing. An elongated opening 44 with the sides thereof struck with arcs from the axial center of the opening 42 is formed in the leg 40, and a pointer 45 adjacent to the opening 44 extends from the leg 40. The horizontal leg 41 of the finder has extending therefrom the lug 46 with the circular opening 47, and the elongated opening 48 having curved sides struck with arcs from the axial center of the opening 47. A pointer 49 adjacent to the opening 48 is formed with the leg 41, and lugs 50 extend up from said leg.

The office of the screw pivot 43 is to suspend the view finder to the side wall 30 of the camera. A screw 51 is in threaded engagement with the opening 34 in the plate 31 of the side wall 30 and passes through the opening 44 to clamp the finder in proper axial alinement. The under side of the head of the screw 51 bears on the spring washer 52 interposed between the under side of the head of the screw 51 and the leg 40.

When the view finder is to be mounted on the roof 22 of the camera, a screw not shown passes through the opening 47 of the lug 46 and engages the opening 27 of the plate 26, and a screw 53 with a spring washer 54 are provided to engage the opening 25 of the plate 23.

A pair of lens barrels, comprising the upper barrel 60 and lower barrel 61 are pivoted to the leg 40 by means of the pivot screw 62, that engages an opening 63 in said leg and is secured in the lens barrel 61. The barrels are each preferably rectangular in cross-section and at the outer end of the upper barrel 60 is located a plano-concave lens 64, with cross lines 65, 66 and which combination I designate the crystal view finder or reducing glass. The lower barrel 61 has slidably fitted therein the sliding tube 67 which carries the biconvex lens 68 at the outer end thereof, and which I designate the enlarging glass. A frosted glass 70 is located at the rear end of the barrel 61. The barrel 61 in this instance is mounted in and has fastened thereto a sleeve having the side walls 72, 73, the roof 74 and the bottom wall 75.

An elongated opening 80 with curved side walls having arcs struck from the axial center of the opening 63 is formed in the wall 73. A handle 81 and a pointer 82 extend from the wall 73. A scale 83 is formed on the leg 40 for the pointer 82. A screw 86 is in threaded engagement with the leg 40 and passes through the opening 80.

A spring washer 87 is interposed between the head of the screw 86 and the wall 73. The handle 81 in conjunction with the screw 86 allow the lens barrels to incline at various inclinations and which are indicated to the user by means of the pointer 82 and scale 83. A screw 90 is in threaded engagement with a wall of the barrel 61 and can bear against the tube 67 to clamp the latter in position. To the wall 72 of the sleeve just described is adjustably secured a mirror support with the main wall 92 having the sight notch 93 and the side wall 94 having an opening for the screw 95 that is supported in the wall 72. A spring washer 96 is interposed between the head of the screw 95 and the wall 94. A mirror 97 is carried by the wall 92.

In using the view finder it will be noted that it can, in the first instance be mounted in different angular positions to the side or on the top of the camera casing, the adjustments being made and read respectively by means of the screws 51 and 53 and their accompanying scales 32 and 24, secondarily the angular positions of the lens barrels can be adjusted and the inclinations read, respectively by the screw 86 and the scale 83.

The mirror support with the mirror 97 enables the operator to use the lower lens barrel by sighting from the top, and the sight notch 93 with the cross lines 65, 66 of the lens 64 permits the operator to properly locate the finder and consequently the camera on the object to be photographed.

The object of the upper barrel 60 is for the purpose of quickly identifying the object to be photographed and for use in high sun light when the image can not be viewed on the frosted glass 70.

To use the finder, the scales 24, 32, 83 are constructed so that any pointer of the finder will indicate on its co-acting scale the proper inclination to which the finder has to be inclined for different distances of objects from the camera. For example, the finder may be supposed to be located on one side of the camera and near the bottom thereof, as indicated in the drawings. The user then brings the pointer at the proper division on the scale 32, corresponding to the distance of the object from the lens of the camera. This brings the object on the sensitized material in the camera in the same relative position as on the frosted glass of the finder. The operator next brings the object to a proper focus in the finder by means of locating the sliding tube 67 in the proper position and which determines the proper adjustment of the lens of the camera. In case the finder is located on the side of the camera and near the top thereof, the pointer 82 and scale 83 and their appurtenances are used instead of the pointer 45 and scale 32.

In case the finder is located upon the top of the camera, the pointer 82 and scale 83 are used, as explained for the pointer 45 and scale 32, and in addition thereto the scale 24 and pointer 49 may be used for horizontal adjustment as explained for the pointer 45 and scale 32.

Having described my invention what I desire to secure by Letters Patent and claim is:

1. In a view finder the combination of a frame, means to adjustably connect said frame to the casing of a camera in either of two planes, a pair of lens barrels one over the other adjustably connected to the frame to enable the longitudinal axes of the barrels to be located at different inclinations, a reducing glass for the upper barrel and an enlarging glass for the lower barrel.

2. In a view finder for a camera the combination of a frame, means to adjustably connect said frame to the top of a camera casing for adjustment in a horizontal plane, means to adjustably connect the frame to a side wall of said casing for adjustment in a vertical plane, a pair of lens barrels one over the other adjustably connected to said frame, a reducing glass for the upper barrel and an enlarging glass for the lower barrel.

3. In a view finder for a camera the combination of a frame, a pair of lens barrels one over the other and adjustable in a vertical plane connected to the frame, a reducing glass having cross lines for the upper barrel, a sliding tube in the lower barrel, an enlarging glass for the sliding tube, a support adjustably connected to the frame at the rear of the lower barrel and having a sight notch to coact with the said cross lines, a mirror carried by said support to sight through the lower barrel from above and a frosted glass located at the rear end of the lower barrel coacting with said mirror and the glass of the sliding tube.

4. In a view finder for a camera the combination of a frame comprising a vertical leg and a horizontal, each leg having an elongated opening and a pointer adjacent thereto, each leg having pivot openings to pivot the frame to either the top or side of the casing of the camera, a spring washer and a screw for each elongated opening to fasten the frame in different positions to the top or side of the camera casing, the pointers of the frame coacting with scales on said casing.

5. In a view finder for a camera the combination of a frame having a scale formed thereon, a pair of lens barrels pivoted to the frame, a sleeve having an elongated opening and a pointer extending from one of said barrels, a screw extending through the elongated opening and in threaded engagement with said sleeve to secure the barrels in different angular positions to said frame.

6. In a view finder for a camera the combination of a frame, a pair of lens barrels adjustably pivoted to the frame, a reducing lens for one of said barels, a sliding tube for the second barrel, and an enlarging lens for said tube.

7. In a view finder for a camera the combination of a frame, a pair of lens barrels connected together and adjustably pivoted to the frame to tilt said barrels to various angles in a vertical plane, a reducing glass for one of said barrels, a sliding tube for the other barrel, an enlarging glass for said tube and means to secure the tube in different positions in the barrel to locate the enlarging glass to a focus.

Signed at the borough of Manhattan, in the county of New York and State of New York this eighth day of July, A. D. 1913.

EBERHARD SCHNEIDER.

Witnesses:
   Mrs. E. St. Schneider,
   Franz Gudat.